United States Patent [19]

Frolov

[11] Patent Number: 4,839,508
[45] Date of Patent: Jun. 13, 1989

[54] CARD READER

[75] Inventor: George Frolov, Farmington, Conn.

[73] Assignee: Emhart Industries, Inc., Farmington, Conn.

[21] Appl. No.: 99,929

[22] Filed: Sep. 23, 1987

[51] Int. Cl.⁴ .......................................... G06K 13/00
[52] U.S. Cl. .................................. 235/477; 235/449; 235/480; 235/482
[58] Field of Search ................ 235/449, 477, 480, 482

[56] References Cited

U.S. PATENT DOCUMENTS

| Re. 29,846 | 11/1978 | Genest et al. | 70/278 |
| 3,622,991 | 11/1971 | Lehrer et al. | 340/147 R |
| 3,705,396 | 12/1972 | Nagaki et al. | 235/477 X |
| 3,836,753 | 9/1974 | Pass | 235/477 X |
| 3,896,293 | 7/1975 | Pass | 235/61.11 R |
| 4,126,780 | 11/1978 | Rosenthal et al. | 235/458 |
| 4,322,613 | 3/1982 | Oldenkamp | 235/477 X |
| 4,519,228 | 5/1985 | Sornes | 70/276 |

Primary Examiner—David L. Trafton
Attorney, Agent, or Firm—Barry E. Deutsch

[57] ABSTRACT

A magnetic card reader for reading data for electronic locks or the like is provided. The reader "reads" data both when the card is inserted and upon withdrawal, thereby decreasing the chances of misreading the data.

6 Claims, 7 Drawing Sheets

CARD READER

BACKGROUND OF THE INVENTION

1. Field of the Invention

The invention relates to magnetic card readers for reading data from cards or badges such as employee badges or key cards for electronic locks. The reader "reads" the data from the card, and furnishes the data to a device wherein the data is utilized such as an electronic door lock, a computer, an encoding or a recording device.

2. Description of the Prior Art

U.S. Pat. No. 4,126,780 discloses an optical card reader having a spring to bias the card away from the light detector and a photo-electric bottom detector to produce a signal when the card reaches the bottom of the reader.

U.S. Pat. No. 4,519,228 discloses an electronic recodable lock which includes a magnetic or optical card reader. The card reader includes a lever activated switch which turns on the reading head when the key is inserted into the slot and an end switch which turns the reading head off when the key reaches the end of the slot.

U.S. Pat. No. 3,896,293 discloses a card reader having a constant velocity card transport mechanism. This reader utilizes a cantilever spring to urge a roller which contacts the card toward the read head so that the coded portion of the card will be forced against the read head.

U.S. Pat. No. Re. 29,846 discloses an electronic lock system which includes a key card reader. This card reader contains a micro switch to activate the read sensors after the card has been fully inserted.

U.S. Pat. No. 3,622,991 discloses an electronic locking system which includes an optical card reader system. This card reader utilizes a shutter which is capable of limited pivotal movement to insure correct orientation of the key card in the slot.

None of these patents disclose or suggest the improved card reader of the present invention.

A general problem presented by prior art card readers, such as those described above, includes misreading the data contained on the cards. Such a problem is particularly troublesome for card readers utilized for electronic door locks because the insertion of the correct card key will not result in opening the lock if the data is misread. Misreading may be caused by a misalignment of the card with the read head. In addition, misreading may occur because the card does not move past the read head at a velocity which the read head can accept. Solutions to these problems have been proposed in the art, however, such proposed solutions have proved to be costly to manufacture and maintain.

SUMMARY OF THE INVENTION

It is an object of the present invention to provide a card reader that minimizes misreading of the data on the cards. This is accomplished by providing a card reader which reads the data on the card twice, once when the card is being inserted into the reader and once when the card is withdrawn. The card reader thus is provided two chances to correctly read the data found on the card.

A reader according to the present invention is most suitable for those applications which compare the data read to stored data and produces a "go" signal if they match and a "no-go" signal if they do not. Examples of these applications are electronic door locks where the lock is opened if the data matches but remains locked if it does not. Other examples include card readers for employee badges and the like where attendance or the details of a night watchman's rounds are recorded or encoders in which a card is encoded with data and then the encoded data is checked against stored data.

The card reader of the present invention accomplishes the dual reading function by means of a simple and inexpensive spring device. The spring is formed to include two arms. One arm supports the read head and biases it toward the card. The other arm contains two pivot points so that when the card is initially inserted a portion of the spring will deflect and thus activate a first micro switch which in turn activates the reading head and the corresponding electronic and logic circuitry. As the card continues to be inserted, it passes a second or central pivot point so that when it reaches the end of the path, the spring will deflect and activate a second micro switch. The second micro switch signals that the insert reading has ended and that the withdrawal reading should begin.

DESCRIPTION OF THE PREFERRED EMBODIMENT

Figure 1:
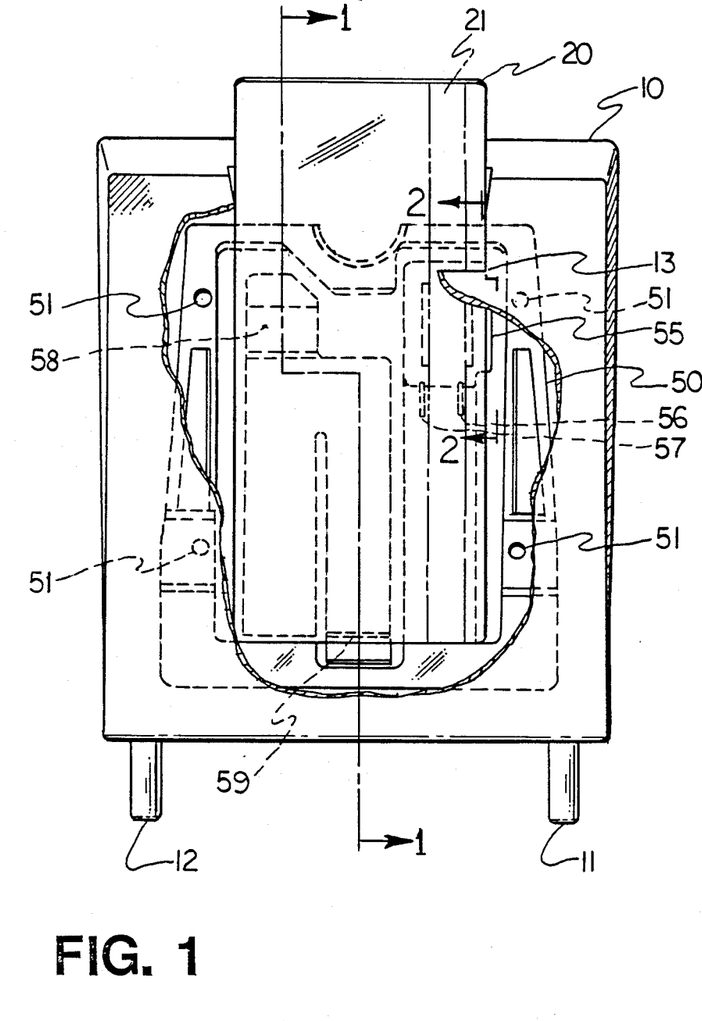
FIG. 1 shows a card reader according to the present invention with a portion of the outside cover broken away to show a card fully inserted and the card reader spring in phantom.
Figure 2:
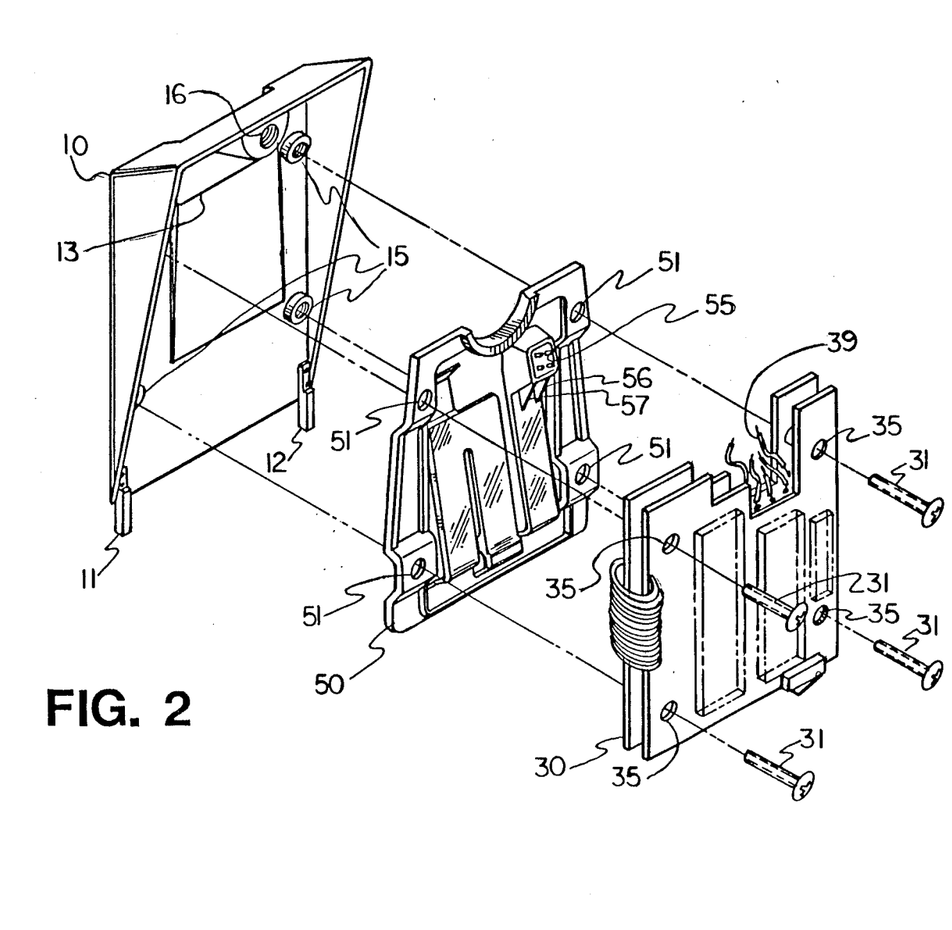
FIG. 2 is an exploded view of the card reader, showing the outside cover, card reader spring and electronic module.

Referring to FIGS. 1 and 2, a card reader according to the present invention includes an outside housing or cover 10. Two protruding arms 11 and 12 are positioned to be received by the apparatus in which the card reader is employed. A slot 13 is positioned horizontally in outside cover 10. The slot is sized to accept a card 20 which contains a magnetic strip 21.

Card reader spring 50 and electronic module 30 are attached to the inside of cover 10 by means of screws 31 through holes 35 of the electronic module and through holes 51 of spring 50. The screws attach into threaded holes 15 in bosses on the inside of cover 10. The card reader is secured to the apparatus in which it is employed by screw means into threaded hole 16.

A magnetic read head 55 is attached to one arm of card reader spring 50 by means of any suitable adhesive, such as, for example, an anaerobic or moisture curable adhesive. Supports 56 and 57 are provided for structural rigidity. Read head 55 may be any suitable magnetic strip reader. The read head is connected to the electronic module by means of wires 39 or flexible circuit strip (not shown).

Figure 3:
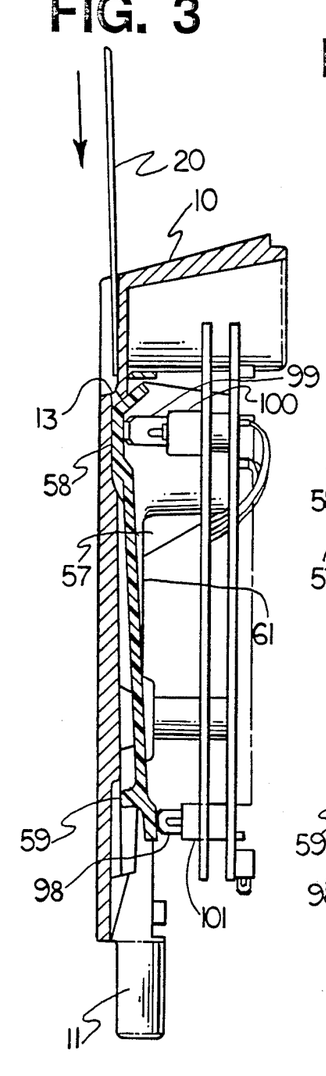
FIGS. 3, 4 and 5 are side sectional views of the reader mechanism taken along section line 1—1 with the card prior to insertion, partially inserted and fully inserted.
Figures 4, 5:
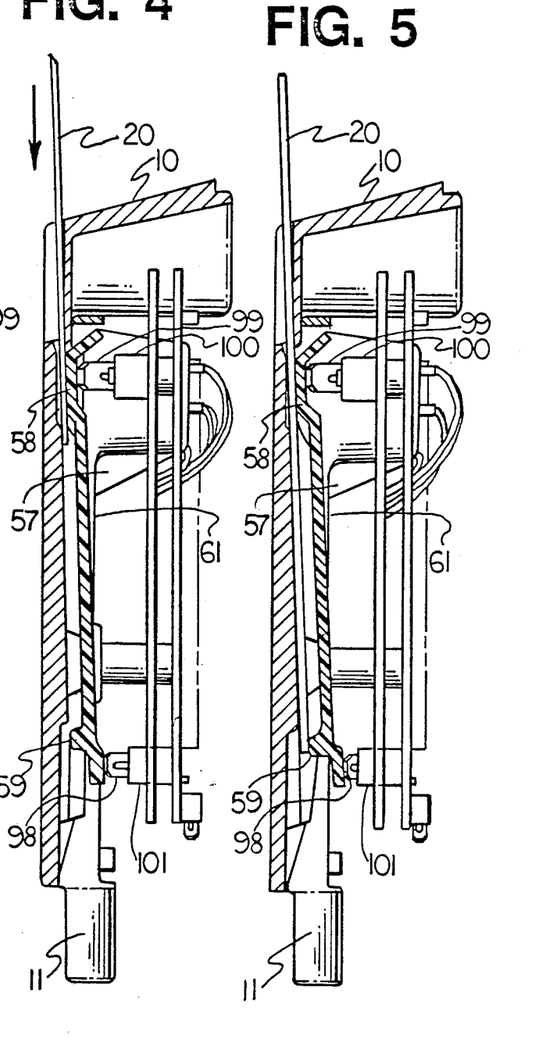

Referring to FIGS. 3, 4 and 5, the operation of the card reader will be explained in greater detail. In FIG. 3 the card 20 is positioned immediately outside of the slot 13. Microswitch 100 is in an open or "off" position. As card 20 is inserted through slot 13 and into the passage, it encounters indented portion 58 of spring 50 (see FIG. 4). At the initial encounter, spring 50 deflects and depresses lever 99 and thus actuates microswitch 100, which activates the entire electronic module as well as the read head. FIG. 4 depicts microswitch 100 in a depressed or "on" position. The read head reads data contained on card 20 as card 20 continues down the passage. At the end of the passage, card 20 encounters raised portion 59 of spring 50 (see FIG. 5). At this encounter, spring 50 deflects, depresses lever 98 and thus actuates microswitch 101. FIG. 5 depicts microswitch 101 in a depressed or "on" position. Microswitch 101 signals to the electronic circuitry that the insert reading has ended and that withdrawal reading should begin.

Figure 6:
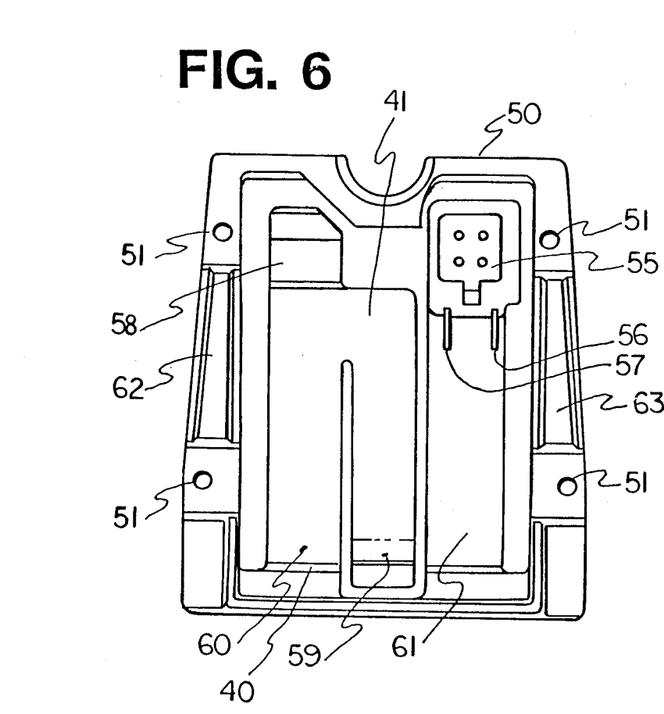
FIG. 6 is a rear view of the card reader spring.
Figure 7:
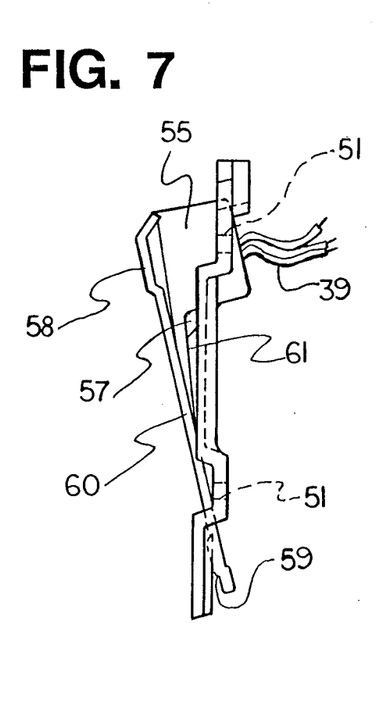
FIG. 7 is a side view of the card reader spring.

Referring to FIGS. 6 and 7, the configuration of card reader spring 50 will be explained in greater detail. Spring 50 has a frame or base portion to which two arms 60 and 61 are attached. The base of the spring can accommodate one or more indented areas 62 and 63 for structural rigidity. Right arm 61 is generally rectangular and attached to the base of the spring. The reading head 55 is attached to the right arm 61 at the end opposite the attachment to the base. Right arm 61 is biased toward the outside cover 10 of the card reader and is responsive to insertion of said card. Particularly, right arm 61 is adapted to urge read head 55 toward card 20. Left arm 60 is generally shaped like a small "h" with only the lower left portion of the h being attached to the base of the spring. Left arm 60 includes two pivot points which allows it to perform two functions. The approximate locations of the pivot points are identified by the numbers 40 and 41. The upper portions of the left arm of the spring has an indented configuration with a crown 58 located at the top of the h. The indented configuration and crown 58 are depicted in side view FIG. 7. The lower right portion of the h shaped left arm contains another raised portion identified by the numeral 59. Microswitch 100 is located under crown 58 and microswitch 101 is located under raised portion 59 of the left arm 60 of spring 50. The left arm 60 of spring 50 is also responsive to insertion of said card. Particularly, left arm 60 is biased away from microswitches 100 and 101 and toward outside cover 10 of the card reader.

The spring 50 can be made of any suitable material but is preferably made of a plastic such as that sold under the Trademark Lexan by General Electric. It is contemplated that other materials with equivalent or similar properties may also be employed. The spring may be manufactured by any suitable method but is preferably made by injection molding.

Figure 8:
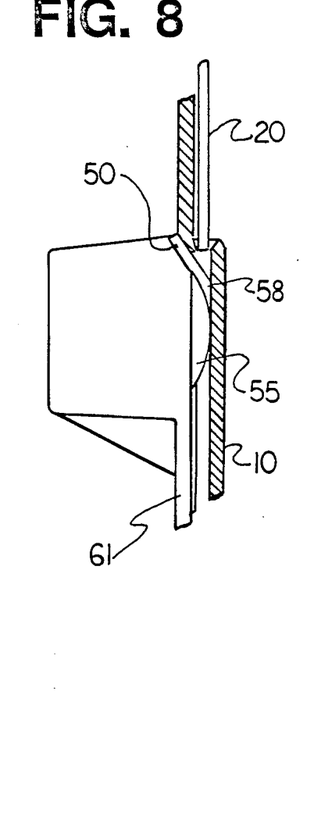
FIGS. 8, 9 and 10 are side sectional views taken along section line 2—2 with the card prior to insertion, after insertion but prior to being read and after insertion as reading is commenced.
Figures 9, 10:
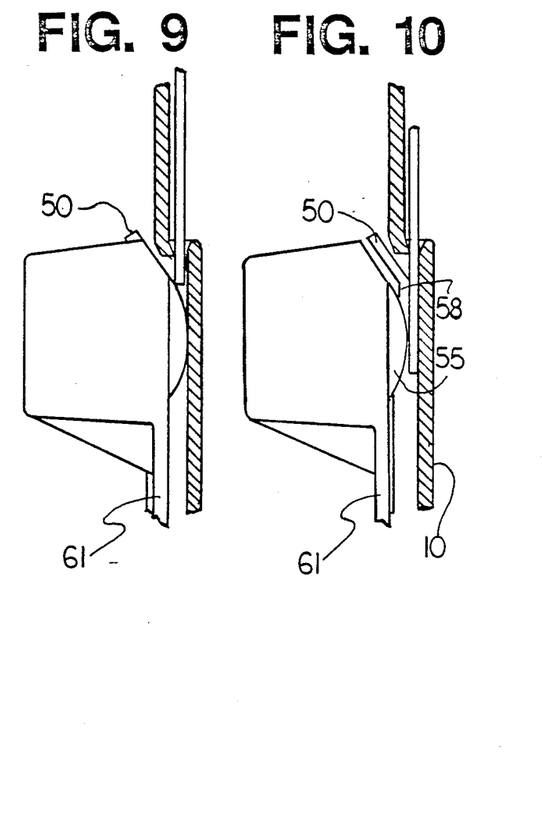

Referring to FIGS. 8, 9 and 10, the sequence of operation concerning microswitch 100 and read head 55 will be described. In FIG. 8, card 20 is not inserted. Crown portion 58 of left arm 60 of card reader spring 50 as well as read head 55 are shown biased against outside cover 10. In FIG. 9, as the card is partially inserted into the card reader, it moves past crown portion 58 of spring 50. It pushes against the spring and forces it to the left. Crown portion 58 is positioned such that this movement is sufficient to depress lever 99, thus actuating microswitch 100 and activating the electronic module (shown in FIG. 4). This occurs before the card travels to the center of read head 55, the location for reading the data. Referring to FIGS. 4 and 10, microswitch 100 has been actuated, which in turn has activated the electronic and logic circuitry as well as read head 55. The read head can thus read data encoded on magnetic strip 21 as soon as it is pushed past the center of read head 55. This feature allows data to be encoded along the entirety of magnetic strip 21. In the position shown in FIG. 10, card 20 has not yet encountered raised portion 59 of the left arm 60. Accordingly, raised portion 59 has not yet deflected and microswitch 101, which is located beneath raised portion 59, has not yet been actuated.

Referring next to FIG. 5, the card 20 has been inserted to the fullest extent. As it was inserted past the read head 55, the read head was reading the information encoded on magnetic strip 21. Toward the end of its travel, the card encountered raised portion 59. Spring 50 is biased away from microswitch 101. As the card 20 contacted the raised portion, it pushed it to the right, thus depressing lever 98 of microswitch 101 located beneath the raised portion 59. This in turn actuates microswitch 101.

When microswitch 101 is actuated, microswitch 100 is still engaged and thus read head 55 is still activated. Microswitch 101 performs two functions. First, microswitch 101 signals to the logic circuit that the travel of the card has been completed, so that the information read by the read head can be transmitted to the logic circuitry where it can be compared with the information stored therein to determine if the information matches and the lock can be opened. If a match were found, the lock would be opened. Often times, however, when inserting the card, the read head does not properly read the data and thus sends incorrect information to the logic circuitry, resulting in no match and the lock not being opened. In this situation, the user must remove the card and try again. It is to this situation that the present card reader provides a novel approach in which microswitch 101 signals the logic circuit to began accepting information from a second reading, as the card is withdrawn. The second function of microswitch 101 is to initiate the withdrawal reading. Thus, if the reader incorrectly reads the information on insertion of the card, it is given another chance to reread the information as the card is withdrawn. In this manner the user of the system is given two chances each time the card is inserted, thus improving the probability of a correct read and opening of the door if the data matches.

Figure 11:
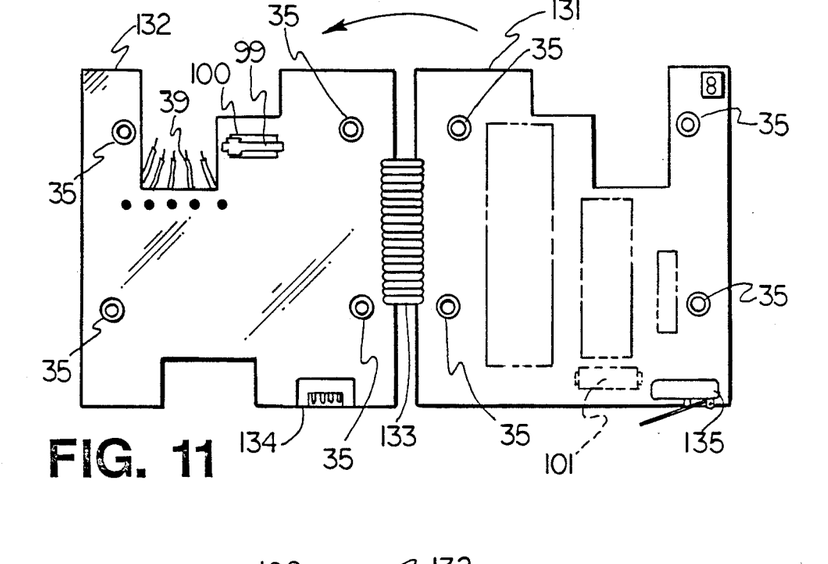
FIGS. 11 and 12 show the electronic module.
Figure 12:
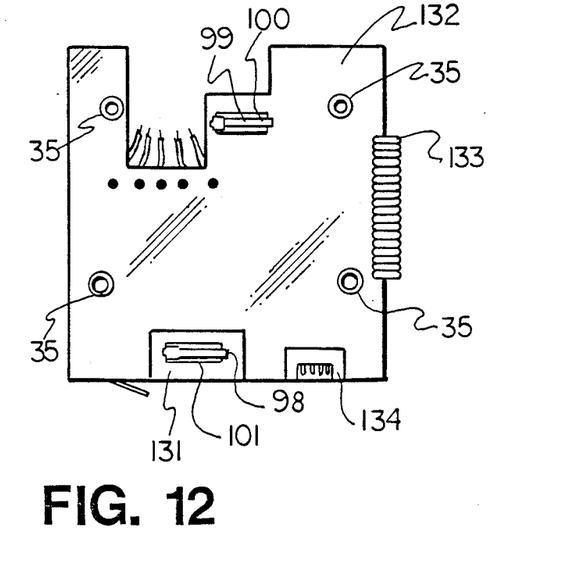

Referring to FIGS. 11 and 12, the electronic module 30 contains the electronic and logic circuitry to operate the reader. In addition, the module may contain circuitry to operate a device such as an electronic lock. Power is supplied by batteries or external power structure (not shown). Batteries may be of any suitable type.

Electronic module 30 comprises two boards 131 and 132 movably connected by wire and tape connector 133. Microswitch 101 as well as microprocessor chips are located on board 131. Details of the preferred electronic and logic circuitry may be found in commonly assigned application Ser. No. 099,914.filed in even date herewith and entitled "Improved Code Reader", the contents of which are incorporated by reference. Microswitch 100, read head wires 39 and connection means 134 are also located on board 132. Connection means 134 are provided so that the "go" signal generated by the circuitry can be transmitted to the device being actuated. As can be seen, board 31 swings around behind board 132 so that holes 35 line up to accept screws 31 (shown in FIG. 2). In addition, portions of board 132 are cut away as shown to provide space for microswitch 101 and read head 55.

Figure 13:
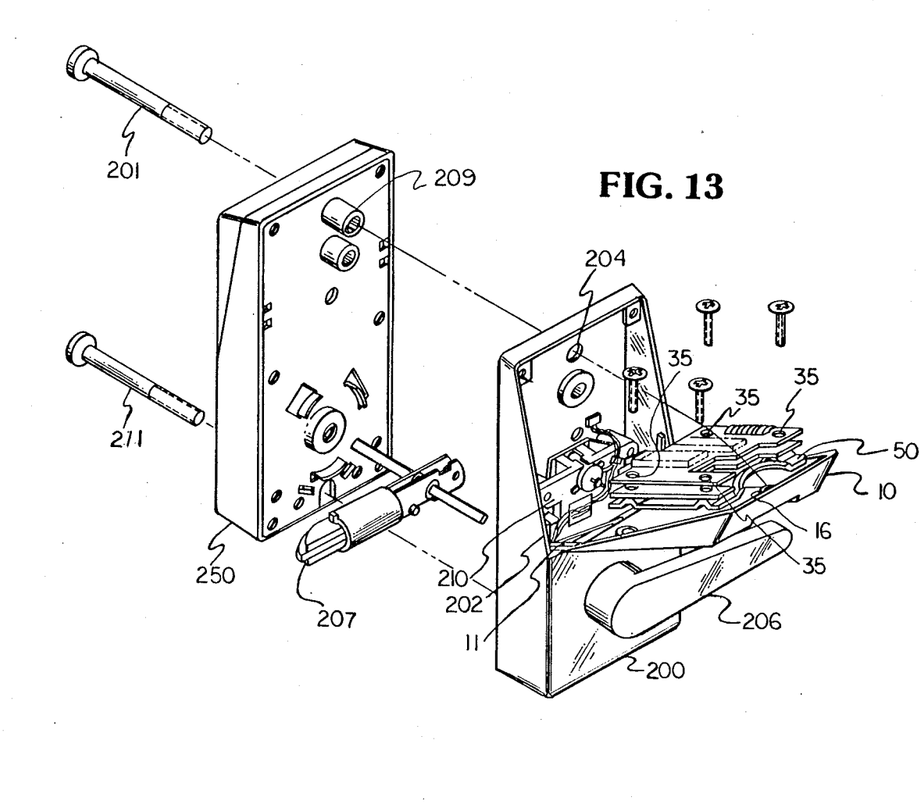
FIG. 13 shows the card reader mechanism used as part of an electronic door lock system.

The card reader is illustrated as a part of an electronic lock in FIG. 13. The preferred electronic door lock with which the present invention can be utilized comprises a housing 200, outside lever 206, a lock operating mechanism 210, a latch bolt assembly 207, an inside housing 250 and inside lever (not shown). A strike box and strike plate (not shown) are mounted on the door jamb in a conventional manner. Details of the preferred electronic door lock are described in commonly assigned application Ser. No. 099,937, filed on even date herewith and entitled "Locking Mechanism for Multifunctional Electronic Lock", and in commonly assigned application Ser. No. 099,921 filed on even date herewith and entitled "Control for Electronic Lock", the contents of both of which are hereby incorporated by reference.

The card reader, including outside cover 10, spring 50, and electronic module 30, is located in the upper right of the housing 200 of the electronic lock. The card reader is secured to the lock by protrusions 11 and 12 and by screw 201. Tabs 202 are positioned so that protrusions 11 and 12 can rest against them and hold the card reader in a relatively horizontal position for servicing. Screw 201 is positioned so that access is from the inside of the door. Screw 201 fits through a hole 209 in inside portion 250 of the electronic lock, through hole 204 in the back plate of outside portion 200 and secures the card reader by threaded hole 16 when the outside cover is pivoted upward into position.

What is claimed is:

1. A magnetic card reader comprises:
  a cover;
  a slot in said cover to accept a card;
  a magnetic reading head movably mounted within said cover;
  a first switch means positioned within said cover to initiate entry reading of the card;
  a second switch means positioned within said cover to terminate entry reading of the card and to initiate withdrawal reading of the card;
  spring means responsive to insertion of said card to actuate said first and second switch means.

2. The card reader of claim 1 wherein said spring means urges said read head toward said card.

3. The card reader of claim 1 wherein said first and second switch means comprise microswitches.

4. A spring for a magnetic card reader which comprises:
  a base and two arms attached thereto;
  one arm being adapted to bias a read head toward a card;
  the other arm being adapted to actuate two microswitches; the first microswitch being actuated as the card initially enters the reader and the second microswitch being actuated when the card reaches the end of its travel.

5. The spring according to claim 4 wherein said arm adapted to bias the read head is rectangular in shape.

6. The spring according to claim 4 wherein said arm adapted to actuate the microswitches is shaped like a small h and is attached to the base at the lower left portion thereof.

* * * * *